United States Patent [19]

Tezuka

[11] Patent Number: 4,905,801
[45] Date of Patent: Mar. 6, 1990

[54] CONTROL SYSTEM FOR A CLUTCH FOR A MOTOR VEHICLE

[75] Inventor: Kazunari Tezuka, Asaka, Japan

[73] Assignee: Fuji Jukogyo Kabushiki Kaisha, Tokyo, Japan

[21] Appl. No.: 193,893

[22] Filed: May 13, 1988

[30] Foreign Application Priority Data

May 20, 1987 [JP] Japan .................. 62-122874

[51] Int. Cl.⁴ .................. B60K 41/02; F16D 37/02
[52] U.S. Cl. .................. 192/0.032; 192/0.076; 192/21.5; 364/424.1
[58] Field of Search .................. 192/0.032, 0.076, 21.5; 364/424.1

[56] References Cited

U.S. PATENT DOCUMENTS

| | | | |
|---|---|---|---|
| 3,073,422 | 1/1963 | Baumann | 192/0.052 |
| 4,480,732 | 11/1984 | Takano | 192/0.076 |
| 4,494,641 | 1/1985 | Sakakiyama | 192/0.076 |
| 4,624,349 | 11/1986 | Watanabe | 192/21.5 X |
| 4,669,591 | 6/1987 | Sakakiyama | 192/0.076 |
| 4,715,482 | 12/1987 | Watanabe et al. | 192/0.032 |
| 4,803,628 | 2/1989 | Hayashi et al. | 192/0.032 X |

FOREIGN PATENT DOCUMENTS 59-187118 10/1984 Japan .
60-139540 7/1985 Japan .

Primary Examiner—Rodney H. Bonck
Attorney, Agent, or Firm—Martin A. Farber

[57] ABSTRACT

A control system for an electromagnetic clutch for a vehicle has an engine speed sensor, a clutch driven member speed sensor and a throttle position sensor. The system has a memory storing first torque capacities increasing with increase of engine speed and storing second torque capacities at clutch engagement rate 100% in accordance with engine speed and throttle position. The actual clutch engagement rate is calculated based on output signals of the engine speed sensor and the clutch driven member speed sensor. A first torque capacity and a second capacity are derived from the memory in accordance with output signals of the sensors. A torque capacity Tc for engaging the clutch is calculated as follows, $$Tc = Re \cdot TcL + (1 - Re) \cdot Tcs$$

where Re is the clutch engagement rate, Tcs is the first torque capacity and TcL is the second torque capacity.

9 Claims, 5 Drawing Sheets

CONTROL SYSTEM FOR A CLUTCH FOR A MOTOR VEHICLE

BACKGROUND OF THE INVENTION

The present invention relates to a control system for an electromagnetic clutch for a transmission of a motor vehicle, and more particularly to a system for providing an optimum torque capacity of the clutch in a starting mode of the vehicle and in a lockup engagement mode.

Various systems for controlling the electromagnetic clutch for a continuously variable belt-drive transmission have been proposed by the applicant. Generally, the electromagnetic clutch of the transmission is controlled by a control system to provide various operational modes such as a starting mode of a vehicle, a reverse excitation mode, a drag mode, and a mode of lockup engagement. One of the modes is selected in accordance with a position of a selector lever and driving conditions to control the electromagnetic clutch.

For example, Japanese Patent Laid Open No. 60-139540 (U.S. Pat. No. 4,669,591) discloses a control system for an electromagnetic clutch. In this system the torque capacity of the clutch is controlled to increase with increase of engine speed in the starting mode, while in the lockup engagement mode, torque capacity is controlled in accordance with engine torque which is determined by the engine speed and engine load. In a transient state mode between the starting mode and lockup engagement mode, the torque capacity gradually increases to smoothly change the operational modes. Since the torque capacity increases with the increase of the engine speed, the starting characteristic can be desirably provided. However, there is a discontinuous changing point in the control operation during the transient state mode, which has an unfavorable influence on the control.

The operation of the control system in the starting and lockup engagement modes is described in detail with reference FIGS. 3a, 5a and 5b. The relationship between the engine torque Te and torque capacity Tc of the clutch can be generally expressed as follows.

$$Te - Tc = Ie \cdot d\omega e / dt$$

where Ie is a moment of inertia of the engine and $\omega e$ is an angular velocity of the crankshaft of the engine. When the engine torque and torque capacity are equal, the engine speed is constant ($d\omega e/dt = 0$).

In the starting mode, the torque capacity Tc is controlled as a function of the engine speed Ne as shown in FIG. 3a and by a line Tc in FIG. 5a. The characteristic of the engine torque Te also changes in dependency on the engine speed Ne at each throttle opening degree, as shown by lines Te$\alpha$ Te$\beta$ which show the engine torque characteristics at throttle opening degrees $\alpha$ and $\beta$, respectively. At the throttle opening degree $\alpha$, the torque capacity Tc is equal to the engine torque Tea at a point A when the engine speed is Nea. When the throttle is further opened to the opening degree $\beta$, the engine torque increases from Tea to Teb at a point B, since the engine speed does not quickly increase. After that, the engine speed increases to Nec at a speed in accordance with the following equation.

$$d\omega e/dt = (Teb - Tca)/Ie$$

As the engine speed increases, the engine torque Teb decreases along the line Te$\beta$ toward an engine torque Tec at a point C. At the same time, the torque capacity increases with increasing the engine speed along the line Tc so as to become equal to the engine torque at the point C. Thus, when the engine torque is increased, the clutch slips and thereafter the torque capacity increases with increasing of engine speed, and finally engages again. Namely, there is a converge operation such as the feedback operation.

However, although the clutch engages appropriately, the slipping of the clutch occurs whenever the engine torque changes. Accordingly, in a high vehicle speed range, increase of the engine torque results in rapid increase of the engine speed so that the engine torque is not effectively transmitted by the slipping of the clutch. Thus, driveability and fuel consumption of the vehicle deteriorate.

On the other hand, in the lockup engagement mode, the relationship among the engine torque Te, torque capacity Tc and torque Tr of running resistance of the vehicle can be represented as follows.

$$Te - Tc = Ie \cdot d\omega e/dt$$

$$Tc - Tr = Ib \cdot d\omega b/dt$$

where Ib is the moment of inertia of the vehicle and $\omega b$ is the angular velocity of an output member of the clutch. Since $\omega e = \omega b$ in the lockup engagement mode, $$Tc = (Ib \cdot Te + Ie \cdot Tr)/(Ie + Ib)$$

When the vehicle is in a steady state, the torque Tr of running resistance is equal to the engine torque Te so that the clutch torque Tc is equal to the engine torque Te.

Referring to FIG. 5b, when the throttle opening degree changes from $\alpha$ at a point A, where engine torque and torque capacity are equal to each other, to $\beta$, the engine torque increases from Tea to Teb. Accordingly, the torque capacity increases from Tca to Tcb. Thus, engine speed is constant ($d\omega e/dt = 0$), so that engine torque is transmitted to the transmission system without racing of the engine. However, since the clutch does not slip, the vehicle cannot be smoothly started at the starting mode. Additionally, if the engine torque increases abnormally beyond a predetermined range, the clutch starts to slip. Since the system does not have a converge function, the clutch capacity does not increase, so that the clutch continues to slip.

In order to avoid such disadvantages, Japanese Patent Laid Open No. 59-187118 discloses a system which provides a torque capacity larger than the engine torque. However, during the starting mode, the engine torque is not smoothly transmitted thereby causing the driveability to deteriorate.

SUMMARY OF THE INVENTION

The object of the present invention is to provide a control system for a clutch where optimum torque capacity of the clutch is provided in the starting mode, lockup engagement mode and transient state mode, thereby preventing the above described disadvantages.

According to the present invention, there is provided a control system for a clutch for a vehicle driven by an engine having an engine speed sensor, a clutch driven member speed sensor and a throttle position sensor, the system comprising, a memory storing first torque capacities increasing with increase of engine speed and storing second torque capacities at clutch engagement rate 100% based on engine torque in accordance with engine speed and throttle position, means responsive to output signals of the engine speed sensor and the clutch driven member speed sensor for producing an actual clutch engagement rate signal, deriving means responsive to output signals of the sensors for deriving a first torque capacity and a second torque capacity from the memory, means responsive to the clutch engagement rate signal and first and second torque capacities for calculating a torque capacity by using a predetermined equation.

The clutch is engaged in accordance with the calculated torque capacity.

In an aspect of the invention, the predetermined equation for calculating the torque capacity Tc is $$Tc = Re \cdot TcL + (1 - Re) \cdot Tcs$$

where Re is the clutch engagement rate, Tcs is the first torque capacity and TcL is the second torque capacity.

The other objects and features of this invention will become understood from the following description with reference to the accompanying drawings.

DETAILED DESCRIPTION OF THE PREFERRED EMBODIMENT

Figure 1:
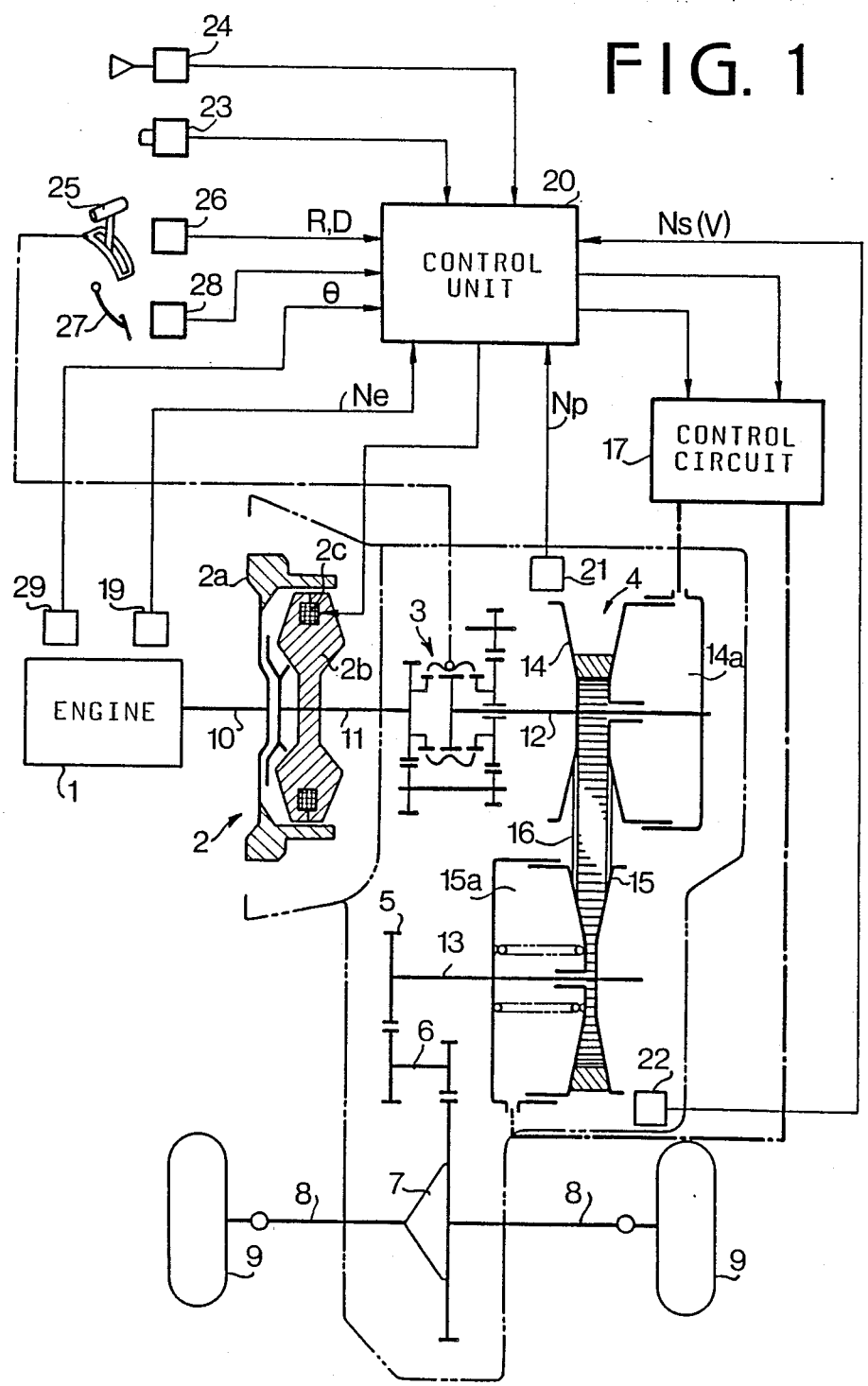
FIG. 1 is a schematic illustration of a system for controlling an electromagnetic clutch for a motor vehicle.

Referring to FIG. 1, a crankshaft 10 of an engine 1 is having a throttle valve operatively connected to an electromagnetic powder clutch 2 for transmitting the power of the engine 1 to a continuously variable belt-drive automatic transmission 4 through a selector mechanism 3. The output of the belt-drive transmission 4 is transmitted to axles 8 of vehicle driving wheels 9 through an output shaft 13, a pair of intermediate reduction gears 5, an intermediate shaft 6, and a differential 7.

The electromagnetic powder clutch 2 comprises an annular drive member 2a connected to crankshaft 10 of the engine 1, a driven member 2b secured to an input shaft 11 of the transmission 4, and a magnetizing coil 2c provided in the driven member 2b. Magnetic powder material is provided in a gap between the drive member 2a and driven member 2b. When the magnetizing coil 2c is excited by the clutch current, driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive transmission 4, the selector mechanism 3 is provided between the input shaft 11 and a main shaft 12. The selector mechanism 3 is provided with a synchromesh mechanism comprising gears, hub, and sleeve for connecting the input shaft 11 and the main shaft 12 to selectively provide a driving position (D-range) and a reverse driving position (R-range).

The continuously variable belt-drive automatic transmission 4 has the main shaft 12 and the output shaft 13 provided in parallel with the main shaft 12. A drive pulley 14 provided with a hydraulic cylinder 14a mounted on the main shaft 12. A driven pulley 15 provided with a hydraulic cylinder 15a mounted on the output shaft 13. A drive belt 16 engages with the drive pulley 14 and the driven pulley 15. Hydraulic cylinders 14a and 15a are communicated with an oil hydraulic control circuit 17. The hydraulic control circuit 17 is responsive to vehicle speed, engine speed and throttle valve position for controlling the amount of oil supplied to the cylinders 14a and 15a. The pulleys 14 and 15 are operated by compressive forces in the cylinders so that the running diameter of the belt 16 is varied to infinitely change the transmission ratio.

An electronic control system for the clutch 2 and the belt-drive transmission 4 has an engine speed sensor 19, and rotating speed sensors 21 and 22 for respectively sensing rotating speeds of the drive pulley 14 and the driven pulley 15. A choke switch 24 produces an output signal when a choke valve of the engine 1 is closed, and an air conditioner switch 23 produces an output signal at the operation of an air conditioner. A selector lever 25 connected to the selector mechanism 3 is provided with a select position sensor 26 for sensing a drive position D and a reverse position R. An accelerator pedal switch 28 is provided for sensing the depression of an accelerator pedal 27, and a throttle position sensor 29 is provided for sensing the opening degree of the throttle valve.

Output signals of the sensors and pulses of the switches are applied to an electronic control unit 20 which produces a clutch current control signal the clutch 2 and a control signal for controlling the transmission ratio (i) and a line pressure control signal the control circuit 17.

Figure 2:
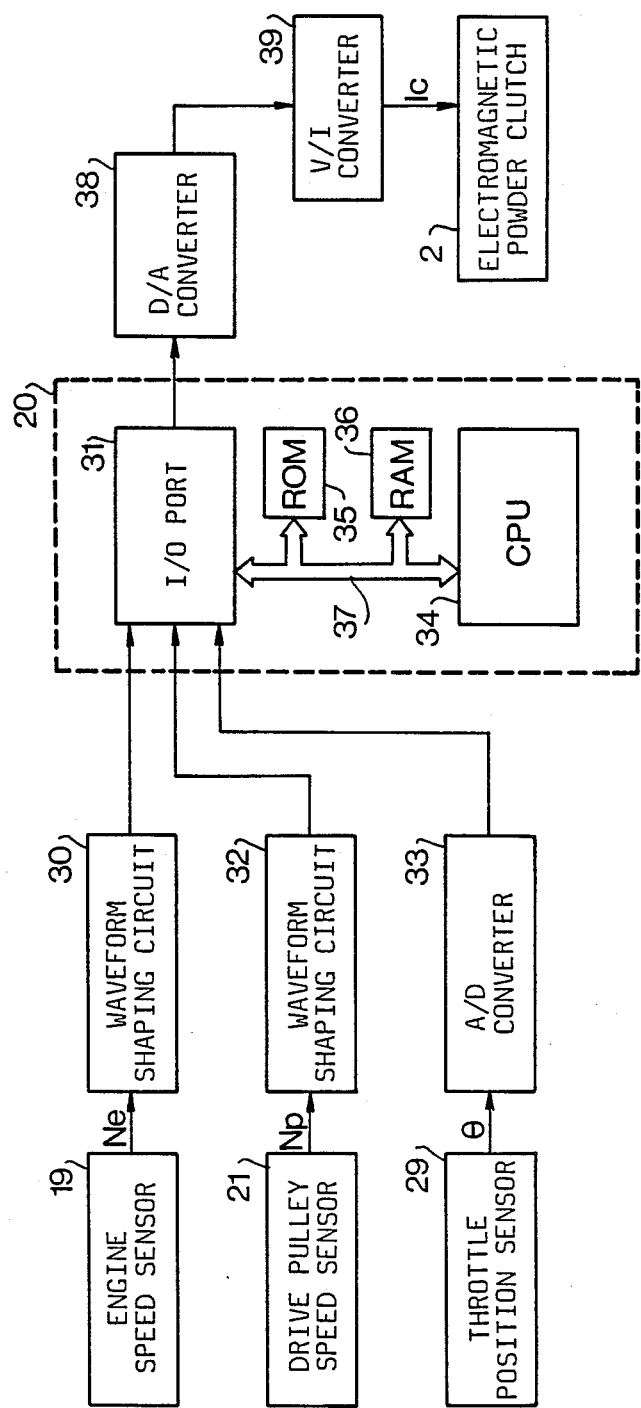
FIG. 2 shows a block diagram of a control unit according to the present invention.

Referring to FIG. 2, the electronic control unit 20 comprises an input/output port (I/0 port) 31, a central processor unit (CPU) 34, a read only memory (ROM) 35 and a random access memory (RAM) 36. The I/0 port 31, CPU 34, ROM 35 and RAM 36 are connected to each other through a bus line 37. An engine speed signal Ne of the engine speed sensor 19, which is an ignition pulse signal, is applied to the I/0 port 31 through a waveform shaping circuit 30 where the ignition pulse signal is shaped into a square wave. A drive pulley speed signal Np from the rotating speed sensor 21 and a throttle position signal θ from throttle position sensor 29 are also applied to the I/0 port 31 through a waveform shaping circuit 32 and an A/D converter 33, respectively.

Figure 3A:
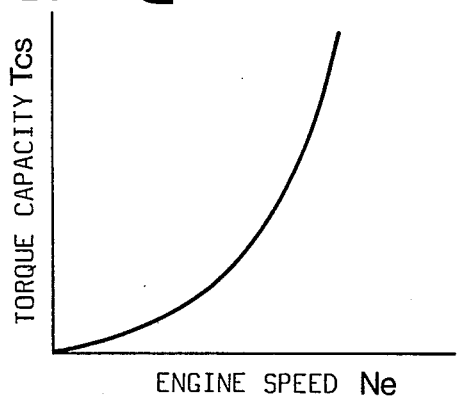
FIG. 3a is a graph showing a characteristic of the torque capacity in a mode.
Figure 3B:
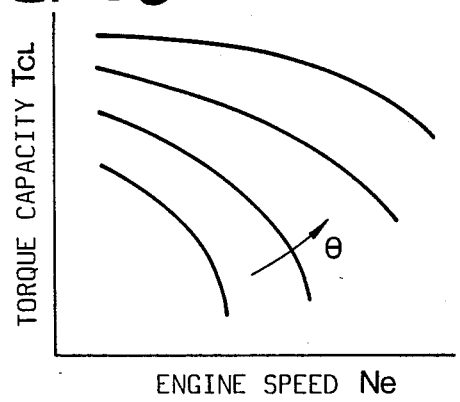
FIG. 3b is a graph showing a characteristic of the torque capacity based on engine torque when the clutch is locked-up.
Figure 4:
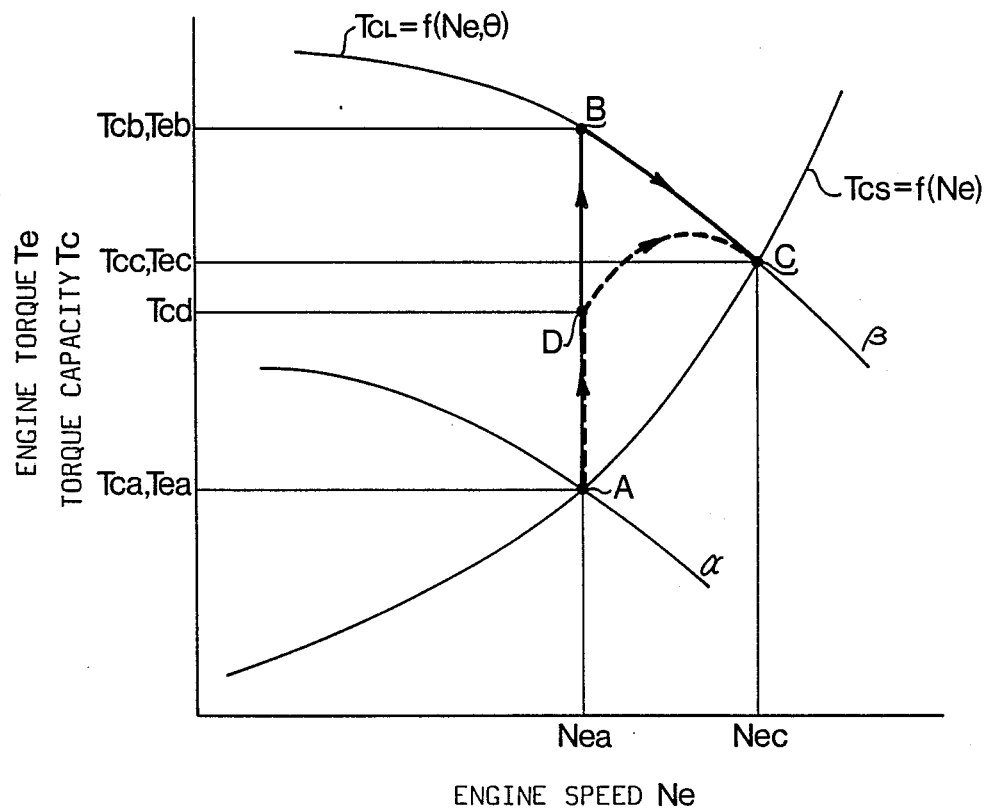
FIG. 4 is a graph showing a characteristic of the torque capacity in the present invention.
Figure 5A:
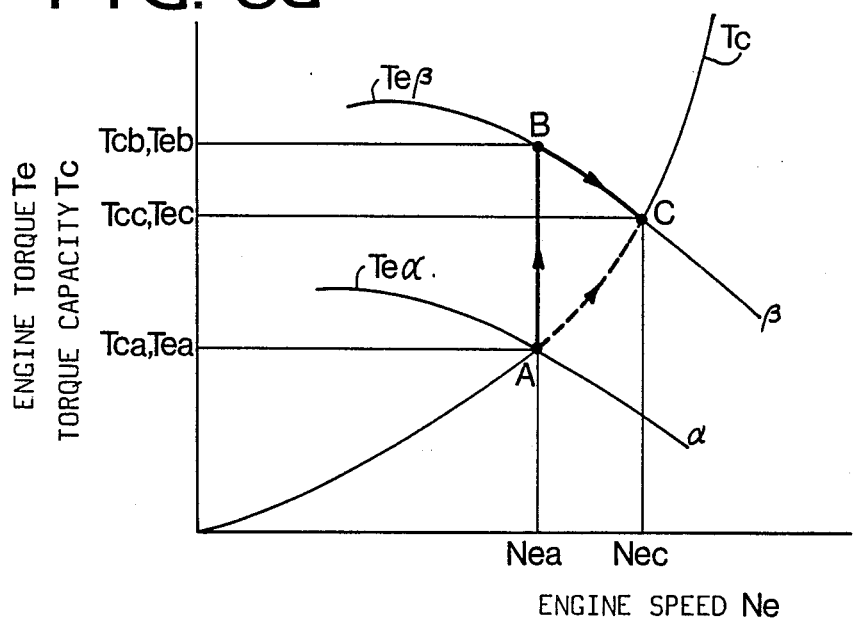
FIGS. 5a and 5b show characteristics of the torque capacity in a conventional control system.
Figure 5B:
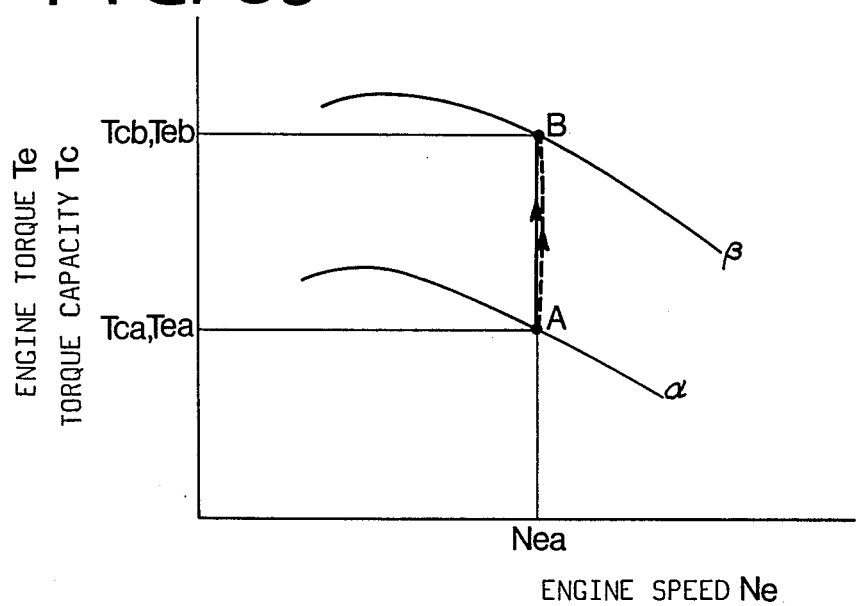

The ROM 35 is provided with maps storing torque capacities of the electromagnetic clutch 2 with respect to the engine speed(NE). Torque capacities Tcs changes as an increasing function Tcs=f(Ne) as shown in FIGS. 3a and 4 which starts at a clutch engagement rate 0%. Torque capacities TcL at clutch engagement rate 100% based on engine torque are also stored in a map (shown in FIG. 3b) of ROM 35 comprising a three dimensional map in accordance with engine speed Ne, opening degree θ of the throttle valve and engine torque Te. The torque capacity TcL changes with the engine torque in accordance with a function TcL=f(Ne, θ), as shown in FIG. 3b, where the torque capacity is equal to the engine torque.

In the control unit 20, an actual engagement rate Re of the clutch is calculated based on the engine speed Ne and the drive pulley speed Np (Re=Np/Ne). The torque capacity TcL is derived from the ROM 35 in dependency on the engine speed Ne and throttle position θ, and the torque capacity Tcs is derived in accordance with engine speed Ne. In the system of the present invention, the torque capacity Tc of the clutch is calculated by the following equation.

$$Tc = Re \cdot TcL + (1 - Re) \cdot Tcs$$

Figure 3C:
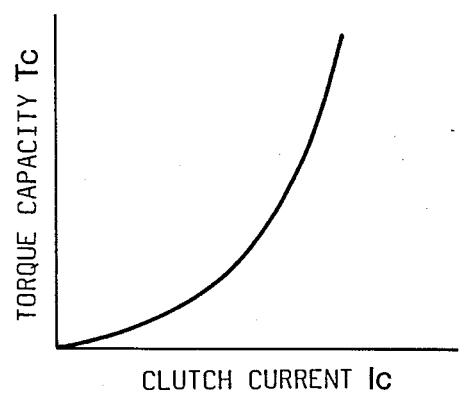
FIG. 3c is a graph showing a relationship between the torque capacity and the clutch current.

Namely, the torque capacity is controlled in accordance with the engagement rate and the predetermined torque capacity Tcs and TcL. The torque capacity Tc, which is outputted from the I/0 port 31 as a digital voltage signal, is converted to an analog voltage signal at a D/A converter 38. The analog voltage signal is further converted at a V/I converter 39 to a clutch current Ic. The clutch current Ic is further supplied to the electromagnetic clutch 2, thereby exciting the magnetic coil thereof. The torque capacity Tc varies in proportion to the clutch current Ic as shown in FIG. 3c.

The operation of the control system will be described hereinafter with reference to FIG. 4.

When the vehicle is driven at a throttle opening degree α and at engine speed Nea, the engine torque Tea and torque capacity Tca are equal at a point A. When the throttle opening degree increases to β, the engine torque increases to Teb at a point B, which is on the line showing the 10 characteristic of the engine torque TcL at throttle opening degree β. This data Tca and Tcb are derived from the ROM 35. The calculation for obtaining the torque capacity Tc is made as follows dependent on the engagement rate Re at the point A and torque capacities Tca and Tcb.

$$Tc = RE \cdot Tcb + (1 - RE) \cdot Tca$$

Thus, the torque capacity increases as shown by a dashed line to a point D, where torque capacity becomes Tcd. Since the torque capacity Tcd is smaller than the engine torque Teb, the clutch slips. The torque capacity Tc increases thereafter along the dashed line toward a point C in accordance with the following equations.

$$d\omega e/dt \cdot Ie = Te - Tc = (1 - Re)\{f(Ne, \theta) - f(Ne)\}$$

$$d\omega b/dt \cdot Ib = Tc - Tr = Re \cdot f(Ne, \theta) + (1 - Re) \cdot f(Ne) - Tr$$

where (f(Ne, θ) represents the torque capacity when the engagement rate is 100%, and f(Ne) represents the torque capacity when the engagement rate is 0%.

On the other hand, engine torque decreases as the engine speed increases to Nec so that the engine torque and the torque capacity again become equal to each other at the point C. Therefore, the slipping rate of the clutch and the magnitude of the racing of the engine dependent on changing of engine torque are properly controlled by the actual clutch engagement rate.

When the engagement rate Re is 0% or 100%, the characteristic of the torque capacity is the same as that in the conventional control system.

The present invention may be applied to other clutches beside an electromagnetic clutch and the engagement rate may be obtained by taking account of other factors such as vehicle speed.

From the foregoing, it will be understood that the present invention provides a control system for a clutch where the clutch is controlled consistently at any driving condition. At a starting mode, the slipping of the clutch is reduced to improve the fuel consumption. At the lockup engagement mode, when the engine torque increases abnormally, the torque capacity increases to engage the clutch, thereby preventing the overheating of the clutch.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A control system for a clutch for a vehicle driven by an engine having an engine speed sensor, a clutch driven member speed sensor and a throttle position sensor, the system comprising:
   a memory storing first torque capacities increasing with increase of engine speed and storing second torque capacities dependent on engine torque characteristic in accordance with engine speed and throttle position;
   means responsive to output signals of the engine sensor and the clutch driven member speed sensor for producing an actual clutch engagement rate signal;
   deriving means responsive to output signals of said engine speed and throttle position sensors for deriving a first torque capacity and a second torque capacity from the memory;
   means responsive to the clutch engagement rate signal and the derived first and second torque capacities for calculating a calculated torque capacity by using a predetermined equation;
   actuating means for engaging the clutch depending on the calculated torque capacity.

2. The system according to claim 1 wherein the predetermined equation for calculating the torque capacity Tc is $$Tc = Re \cdot TcL + (131\ Re) \cdot Tcs$$

where Re is the clutch engagement rate, Tcs is the first torque capacity and TcL is the second torque capacity.

3. The control system according to claim 1, wherein said clutch is an electromagnetic clutch.

4. The control system according to claim 3, wherein said electromagnetic clutch is an electromagnetic powder clutch.

5. A control system for a clutch connected between an engine and driving wheels of a motor vehicle having an engine speed sensor to detect rotating speed of an output shaft of said engine for providing an engine speed signal, a first sensor to detect speed corresponding to rotating speed of a driven member of said clutch for producing a driven member speed signal, and a throttle position sensor to detect opening degree of a throttle valve mounted on said engine, the improvement in the control system comprising:
   first storing means for providing a first clutch torque characteristic with respect to said engine speed signal when said clutch is completely disengaged;
   second storing means for providing a second clutch torque characteristic with respect to said engine speed signal and said opening degree of said throttle valve when said clutch is fully engaged;
   clutch engagement rate setting means responsive to said engine speed and said driven member speed signals for providing a clutch engagement rate;

clutch torque calculating means responsive to said first and second clutch torque characteristics and said clutch engagement rate for calculating a clutch torque; and control means responsive to said clutch torque for controlling said clutch providing optimum control of said clutch so as to smoothly engage said clutch without slipping at a starting mode and to operatively increase clutch torque of the clutch at a lockup mode when said engine torque signal abnormally increases, thereby preventing said clutch from overheating.

6. The control system according to claim 5, wherein said clutch torque calculating means calculates said clutch torque (Tc) by the following equation:

$$Tc = Re \cdot TcL + (1 - Re) \cdot Tcs$$

where Re is the clutch engagement rate, Tcs is the first clutch torque characteristic and Tcl is the second clutch torque characteristic.

7. The control system according to claim 5, wherein said first sensor is a driven pulley speed sensor.

8. The control system according to claim 5, wherein said clutch is an electromagnetic clutch.

9. The control system according to claim 8, wherein said electromagnetic clutch is an electromagnetic powder clutch.

* * * * *